(12) United States Patent
Lucente et al.

(10) Patent No.: US 9,408,281 B2
(45) Date of Patent: Aug. 2, 2016

(54) WIRELESS LIGHTNING CONTROL SYSTEM FOR A WIND TURBINE

(71) Applicant: VESTAS WIND SYSTEMS A/S, Aarhus N (DK)

(72) Inventors: Michele Lucente, Aarhus N (DK); Paw Rosenvard, Gjern (DK); Peter Rasmussen, Viby J (DK); Carsten Lindgaard Jensen, Silkeborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 14/403,870

(22) PCT Filed: Jun. 7, 2013

(86) PCT No.: PCT/DK2013/050177
§ 371 (c)(1),
(2) Date: Nov. 25, 2014

(87) PCT Pub. No.: WO2013/182203
PCT Pub. Date: Dec. 12, 2013

(65) Prior Publication Data
US 2015/0137702 A1    May 21, 2015

Related U.S. Application Data

(60) Provisional application No. 61/657,780, filed on Jun. 9, 2012.

(51) Int. Cl.
*H05B 39/00* (2006.01)
*H05B 37/02* (2006.01)
*F03D 11/00* (2006.01)

(52) U.S. Cl.
CPC ............ *H05B 37/0272* (2013.01); *F03D 11/00* (2013.01); *F03D 11/0066* (2013.01); *H05B 37/0218* (2013.01); *Y02B 20/46* (2013.01); *Y02E 10/722* (2013.01); *Y02E 10/726* (2013.01)

(58) Field of Classification Search
CPC ... Y02E 10/723; Y02E 10/722; Y02E 10/721; Y02E 10/763; Y02E 10/728; Y02E 10/726; Y02E 10/72; Y02E 40/34; Y02E 10/725; Y02E 10/766; Y02E 40/32; Y02E 40/50; Y02E 70/30; F03D 1/0675; F03D 9/003
See application file for complete search history.

(56) References Cited

U.S. PATENT DOCUMENTS

| | | | |
|---|---|---|---|
| 8,449,255 B2 * | 5/2013 | Tadayon | F03D 1/065 416/23 |
| 8,511,177 B1 * | 8/2013 | Makaremi | G01M 5/0033 73/847 |

FOREIGN PATENT DOCUMENTS

| | | |
|---|---|---|
| DE | 102006058147 A1 | 6/2008 |
| DE | 102008062674 B3 | 6/2010 |

OTHER PUBLICATIONS

International Search Report for PCT/DK2013/050177, Feb. 2, 2014.

*Primary Examiner* — Douglas W Owens
*Assistant Examiner* — Monica C King
(74) *Attorney, Agent, or Firm* — Patterson + Sheridan, LLP

(57) ABSTRACT

Provided is a wind turbine that includes a tower, a nacelle, a plurality of light sources mounted within the tower and the nacelle, and a wireless lighting control system. The wireless lighting control system includes a first locally controllable switch for controlling power to the plurality of light sources and a second locally controllable switch for controlling power to the plurality of light sources. The first and second locally controllable light switches are located remotely from each other. The wireless lighting control system further includes a remotely controllable light switch located at each of one or more of the light sources. The remotely controllable switch is configured to wirelessly receive a switch-on signal generated in response to manipulation of at least one of the first and second locally controllable switches, and switch on power to the corresponding light source in response to receiving the switch-on signal.

13 Claims, 5 Drawing Sheets

WIRELESS LIGHTNING CONTROL SYSTEM FOR A WIND TURBINE

FIELD OF THE INVENTION

The present invention relates generally to a wireless lighting control system for a large structure, and in particular to methods and systems for wirelessly switching lights on and off in a tower portion and/or nacelle portion of a wind turbine.

BACKGROUND OF THE INVENTION

A modern wind turbine has at least a tower and a nacelle, which is supported by the tower. During maintenance procedures and/or initial commissioning of the turbine, a technician may need to gain access to the interior of the tower and/or nacelle. To ensure a safe and effective work environment for the technician, an internal lighting system is typically installed in the wind turbine. Moreover, an on/off switch is generally placed in a lower portion of the tower. Placing the switch in the lower portion of the tower (e.g., near an access door of the tower) facilitates switching internal lights on/off when entering/exiting the wind turbine. Some wind turbines may have additional access ports through which a technician may gain access to the inside of the wind turbine. For example, if the wind turbine is located off-shore, technicians may use a helicopter to reach the wind turbine and access the inside of the wind turbine through an access port in the nacelle rather than through an access door in the tower. Therefore, in addition to providing an on/off light switch at the lower portion of the tower, an off/off light switch may be placed in the nacelle.

However, a light switch in the nacelle of a wind turbine is located quite distant (e.g., about 100 to 150 meters in some cases) from the light switch at the bottom of the tower. Therefore, such a configuration of multiple light switches uses substantially more electrical cabling than a single switch configuration. Moreover, when installing a wind park with numerous wind turbines, the amount of cabling needed for the internal lighting system in a single turbine must be multiplied by the number of turbines in the wind park, leading to substantial material and labor costs. Therefore, a better lighting control solution is needed for wind turbines in which multiple light switches are used.

SUMMARY OF THE INVENTION

According to a first aspect, the invention provides a method for switching on/off a plurality of light sources internal to a large structure. The method includes switching on a first light source in the structure in response to a first manipulation of a first locally controllable switch. Next, a first switch-on signal transmitted from the first light source is wirelessly received at a second light source in the structure. The second light source is then switched on in response to the wirelessly received first switch-on signal.

According to a second aspect, the invention provides a wind turbine that includes a tower having a first access port for technicians, a nacelle mounted on and supported by the tower and having a second access port for technicians, a plurality of light sources mounted within the tower and the nacelle, and a wireless lighting control system. The wireless lighting control system includes a first locally controllable switch for controlling power to the plurality of light sources and a second locally controllable switch for controlling power to the plurality of light sources. The first and second locally controllable light switches are located proximate to the first and second access ports, respectively. The wireless lighting control system further includes a remotely controllable light switch located at each of one or more of the light sources. The remotely controllable switch is configured to wirelessly receive a switch-on signal generated in response to manipulation of at least one of the first and second locally controllable switches, and switch on power to the corresponding light source in response to receiving the switch-on signal.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Example methods and systems described herein can be used to control internal lighting in a large structure. In an example embodiment described in detail herein, the large structure is a wind turbine. However, the inventive methods and systems are also applicable to other large structures, such as stadiums, arenas, storage warehouses, or any other structure in which lighting control access at multiple relatively distant locations is desired. For example, a structure described in greater detail below has multiple locally controllable switches that, when manipulated by a technician, can cause all or substantially all of the internal lights (also referred to herein as light sources) of the structure to turn on or off. Moreover, wireless switch-on and switch-off signals transmitted in response to the manipulation of any one of the locally controllable switches facilitate lighting control while reducing the number and length of switch signal carrying cables needed relative to a conventional hard-wired switching configuration.

Figure 1:
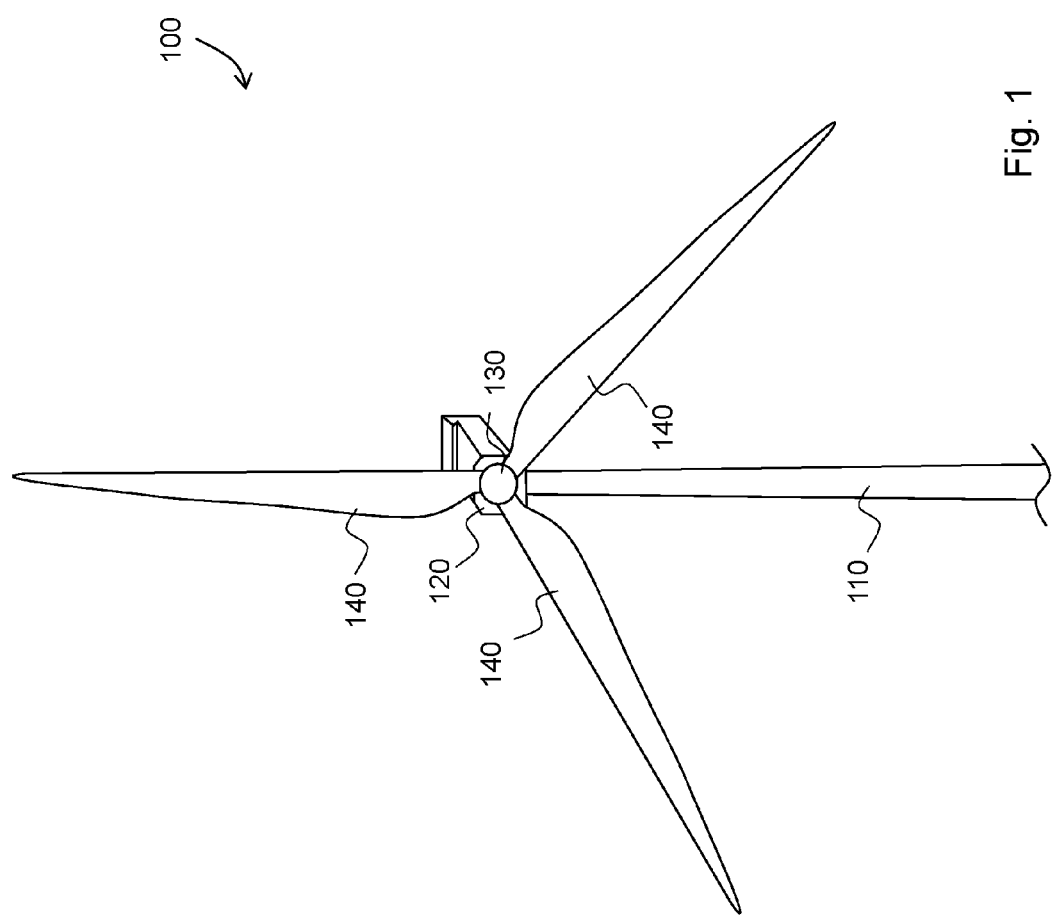
FIG. 1 shows a general structure of a wind turbine.

FIG. 1 illustrates an example wind turbine 100 according to an embodiment. As illustrated in FIG. 1, the wind turbine 100 includes a tower 110, a nacelle 120, and a rotor 130. In one embodiment, the wind turbine 100 may be an offshore wind turbine located over a water body, such as, for example, a lake, an ocean, or the like. The tower 110 of such an offshore wind turbine is installed on either the sea floor or on platforms stabilized on or above the sea level. However, wind turbine embodiments of the invention are not limited only to offshore wind turbines. In alternative embodiments, the wind turbine 100 may be an onshore wind turbine located on land.

The tower 110 of the wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections. In some embodiments of the invention, the tower 110 may be a lattice tower. Accordingly, the tower 110 may include welded steel profiles. In addition, the tower 110 may include an access port (not shown) for technicians to gain access to the wind turbine 100.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 132 may further comprise pitch angle actuators or other mechanisms (not shown) for adjusting the pitch of the blade 140 to increase or reduce the amount of wind energy captured by the blade 140. Pitching adjusts the angle at which the wind strikes the blade 140.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy. In addition, the nacelle 120 may include a helicopter landing pad (not shown) on a top surface thereof and an access port (not shown) similar to the aforementioned access port of the tower 110. Accordingly, a technician has the option of travelling to the wind turbine 100 by helicopter and gaining access to the inside of the wind turbine 100 via the nacelle access port. This option may be of particular value for use in off-shore wind turbines.

Although the wind turbine 100 shown in FIG. 1 has three blades 140, it should be noted that a wind turbine may have a different number of blades. It is common to find wind turbines having two to four blades. The wind turbine 100 shown in FIG. 1 is a Horizontal Axis Wind Turbine (HAWT) as the rotor 130 rotates about a horizontal axis. It should be noted that the rotor 130 may rotate about a vertical axis. Such a wind turbine having its rotor rotate about the vertical axis is known as a Vertical Axis Wind Turbine (VAWT). The wind turbine embodiments described henceforth are not limited to HAWTs having 3 blades. They may be implemented as both HAWTs and VAWTs, having any number of blades 140 in the rotor 130.

Figure 2:
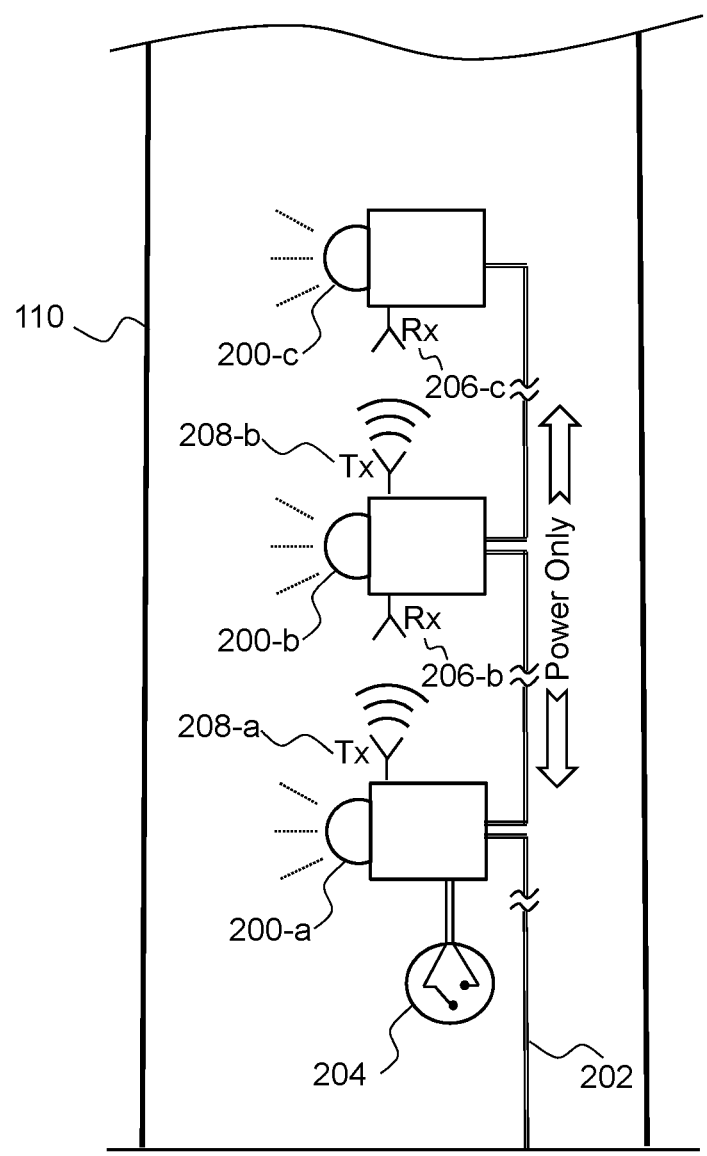
FIG. 2 shows a detailed internal view of a tower portion of the wind turbine.

FIG. 2 shows an internal view of the tower 110 of the wind turbine 100. Internal to the tower 110 are a plurality of lights 200, which are used by a technician during commissioning and/or servicing operations. Although only three lights 200 are depicted, any number of the lights 200 may be located in the tower 110. Moreover, additional lights 200 may be located in the nacelle 120 (not shown). Power lines 202 provide power to the lights 200, e.g., in a parallel wiring configuration.

A wireless lighting control system in the wind turbine 100 includes a switch 204 that is capable of being controlled or manipulated by a technician (i.e., a "locally controllable" switch) to turn on/off one of the lights 200 and one or more remotely controllable switches, each located at a corresponding one of the other lights 200. For example, the switch 204 may be hardwired to one of the lights 200-$a$ to control the flow of power to the light 200-$a$. Alternatively, the switch 204 may be in wireless communication with the light 200-$a$. Whether the coupling is hardwired or wireless, the light 200-$a$ is configured to switch on or off in response to a technician manipulating the switch 204.

The other lights 200-$b$, 200-$c$, remote from the switch 204 are not directly controlled by the switch 204. Rather, a switch-on signal is generated at the light 200-$a$ in response to a switching-on manipulation of the switch 204 and the switch-on signal is wirelessly received by one or more of the remotely controllable switches located at the other lights 200-$b$, 200-$c$. The remotely controllable switches, in turn, switch on power to their associated lights 200. (A receiver 206-$b$ shown in the figure represents the remotely controllable switch at the light 200-$b$. Similarly, a receiver 206-$c$ represents the remotely controllable switch at the light 200-$c$.) The switch-on signal may be transmitted by a wireless transmitter 208-$a$ located at the light 200-$a$. The wireless transmitter 208-$a$ may be, for example, an infrared or other non-visible light source, an acoustic transmitter (e.g., an ultrasonic transmitter), a radio frequency transmitter, or the like, and may be configured to transmit the switch-on signal in response to the switch 204 being turned on by the technician.

When the remotely controllable switch located at the light 200-$b$ causes the light 200-$b$ to switch on, a second switch-on signal is generated by a wireless transmitter 208-$b$ located at the light 200-$b$. The second switch-on signal is received by the receiver 206-$c$, which is part of the remotely controllable switch of the light 200-$c$ and that remotely controllable switch then powers on the light 200-$c$ in the same manner that the light 200-$b$ is powered on in response to receiving the first switch-on signal. This daisy-chain arrangement of lights and wireless transmitters and receivers shown in FIG. 2 may be extended so that any number of lights may be powered on in rapid sequence in response to a technician manipulating the switch 204. In certain embodiments, the light 200-$c$ may be within range to receive the first switch-on signal and power on in response thereto, rendering the second switch-on signal redundant at least with respect to the light 200-$c$. However, such redundancies may be of value to compensate for interference or other anomalies that might otherwise disrupt operation of the lighting control system.

In addition to generating a switch-on signal, the light 200-$a$ generates a switch-off signal. The switch-off signal is generated in response to a switch-off manipulation of the switch 204 by a technician. Like the initially produced switch-on signal, the initially produced switch-off signal is wirelessly transmitted to one or more of the remotely controllable switches located at the other lights 200, which in turn cause additional switch-off signals to be generated and propagated to other lights 200. In this manner, all of the lights 200 receive commands to turn off. The lights may later be turned back on again by implementation of the switching on procedures described above.

The switch 204 may be a first one of multiple switches that have the same or substantially similar function. For example, the switch 204 may be located proximate to an access port in the bottom portion of the tower 110 and another switch similar in function to the switch 204 may be located proximate to an access port in the nacelle 120. Each switch may be located with one to three meters, for example, of a corresponding access port or sufficiently proximate to the corresponding access port so that the safety of a technician is not likely to be compromised in the process of locating and turning on a switch.

Figure 3:
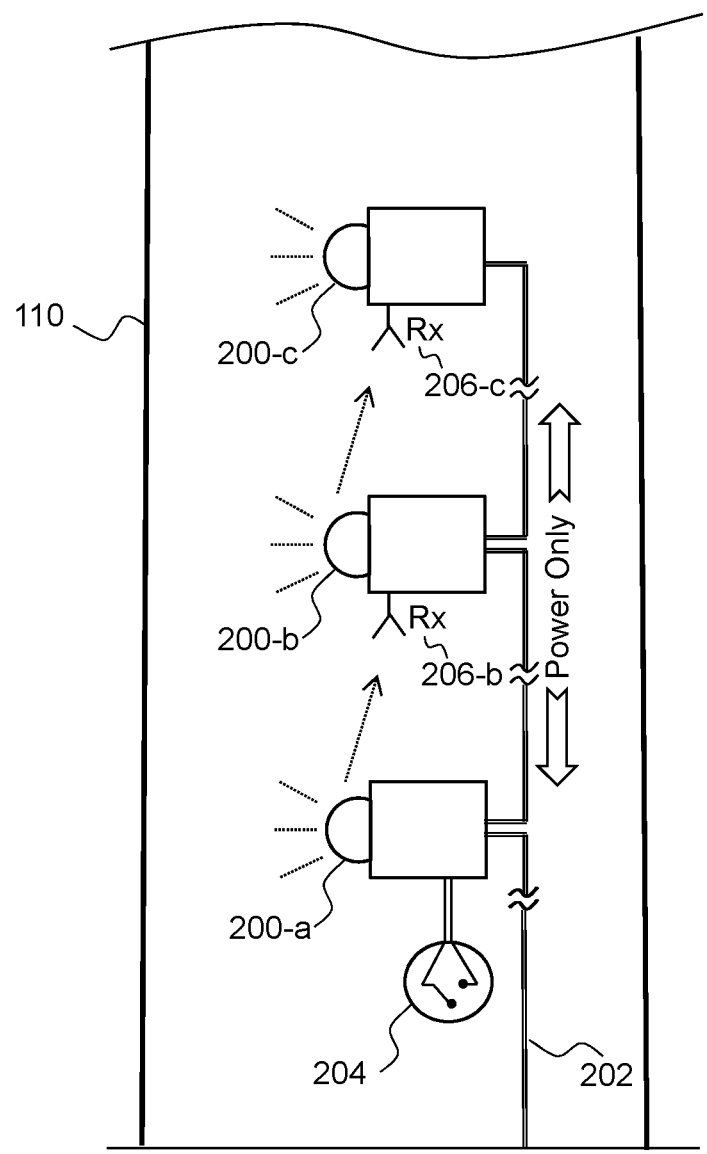
FIG. 3 shows another, alternative detailed internal view of the tower portion of the wind turbine.

FIG. 3 shows an alternative embodiment of the wireless lighting control system shown in FIG. 2. In FIG. 3, the wireless transmitters 208 of the FIG. 2 embodiment are omitted and the switch-on signals are instead transmitted using the visible light generated by the lights 200. Accordingly, each of the receivers 206-c, which wirelessly receive the switch-on signals, may include a visible light photo-detector to indirectly detect when the switch 204 has been turned on and cause a corresponding one of the lights 200 to turn on. Moreover, unlike the embodiment of FIG. 2, no switch-off signals are actively generated. Instead, each remotely controllable switch is configured to wirelessly sense whether a neighboring light source is switched off using the visible light photo-detector. The remotely controllable switch switches off power to a corresponding light 200 in response to sensing that the neighboring light source is switched off.

One benefit of using the light generated by the lights 200 as the switch-on signal is the elimination of the wireless switch-on and switch-off signals. Such wireless signals consume power and might, in some circumstances, disrupt operations and communications of other systems in the wind turbine 100. On the other hand the use of switch-on and switch-off signals may be a more reliable and resilient solution than the use of photo-detectors under certain conditions.

Figure 4:
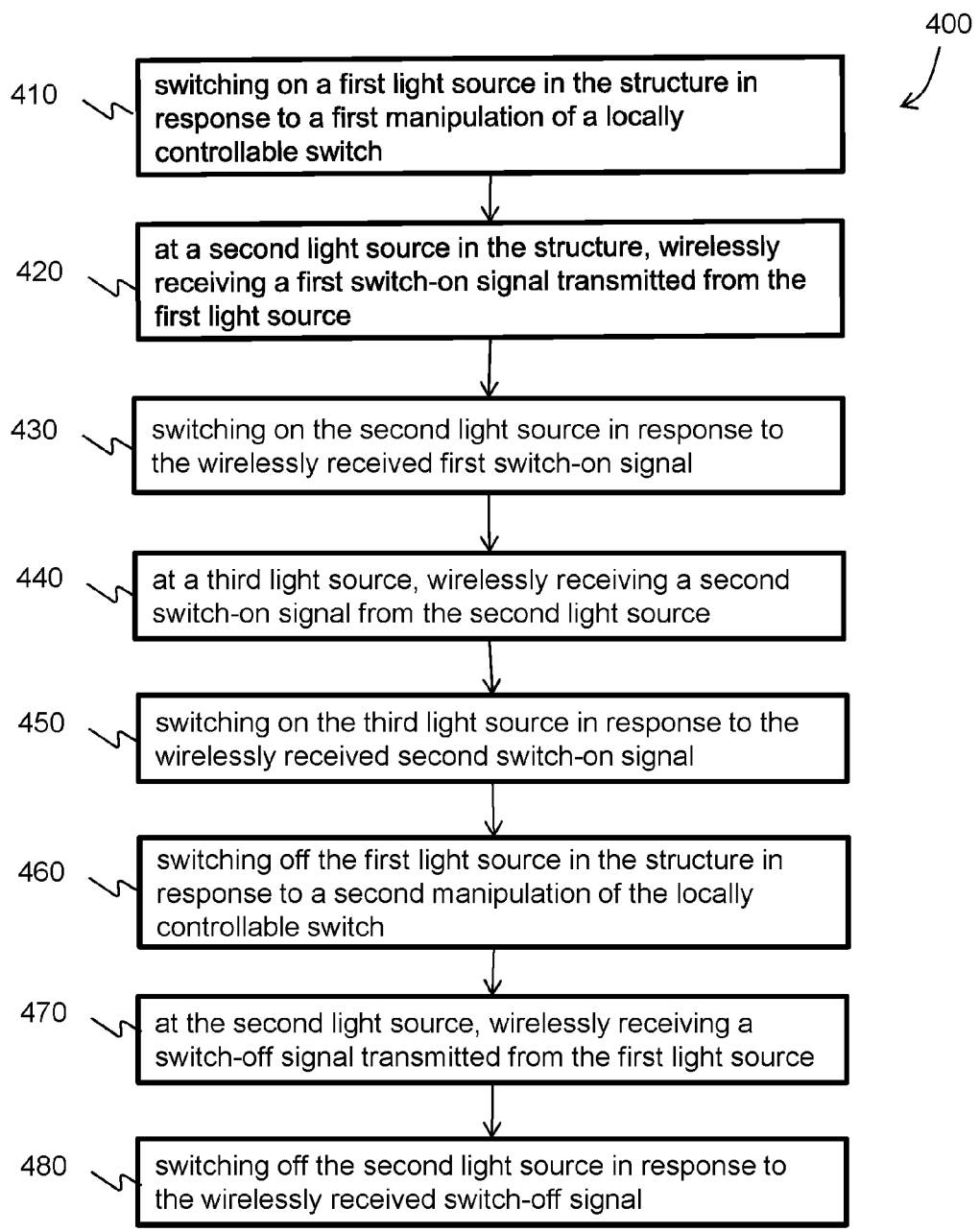
FIG. 4 shows a flow diagram representing an example method for controlling lighting in a structure, such as the wind turbine of FIG. 1.

FIG. 4 shows an example method 400 for switching on/off a plurality of light sources internal to a large structure, such as the wind turbine 100 in FIG. 1. The method 400 may at least partially be implemented by the wireless lighting control system, which includes the locally controllable switch 204 and the remotely controllable switches (represented in FIGS. 2 and 3 by the receivers 206). The method 400 may be implemented when a person, such as a technician, is accessing the structure and needs to use lighting internal to the structure to carry out a task.

At a first stage 410 of the method 400, a first light source in the structure is switched on in response to a first manipulation of a locally controllable switch. For example, a technician may manually move or operate the locally controllable switch to place it in a closed circuit configuration. Moreover, in one embodiment, the switch 204 may serve as the locally controllable switch and the light 200-a may serve as the first light source. At a subsequent stage 420, a first switch-on signal is transmitted from the first light source and wirelessly received at a second light source (e.g., the light 200-b) in the structure. Next, at stage 430, the second light source is switched on in response to the wirelessly received first switch-on signal.

In a first alternative embodiment of the method 400, the first switch-on signal is received as light from the first light source and a photo-detector at the second light source is used to wirelessly receive the light. In a second alternative embodiment of the method 400, the first switch-on signal is one of a non-visible light signal, a radio frequency signal, and an acoustic signal emitted from a wireless transmitter located at the first light source.

At stage 440, a receiver at a third light source wirelessly receives a second switch-on signal from the second light source and, at stage 450, the third light source is switched on in response to the wirelessly received second switch-on signal. The method 400 may be modified to repeat stages 420 through 440 any number of times necessary to switch on additional lights. For example, a third switch-on signal may be transmitted from the third light source to a wireless receiver located at a fourth light source, thereby causing the fourth light source to turn on. This pattern may be repeated for additional light sources.

After a technician has completed the task, the technician may turn off the lights internal to the structure before leaving. More specifically, at stage 460, the first light source in the structure is turned off in response to a second manipulation of the first locally controllable switch. Then, at stage 470, a switch-off signal is transmitted from the first light source and wirelessly received at the second light source. Finally, at stage 480, the second light source is switched off in response to the wirelessly received switch-off signal. Stages 470 and 480 may be repeated as necessary, mutatis mutandis, to turn off any additional light sources.

The method 400 is presented as an example method and, in fact, various modifications to the method, in addition to those described above, are contemplated. For example, the method 400 may be extended to include similar stages in which a second locally controllable switch is used by a technician to turn the lights on and/or off. For example, the method 400 may be adapted for implementation in the wind turbine 100 having a first locally controllable switch located in a bottom portion of the tower and a second locally controllable switch having the same function but located in the nacelle.

Figure 5:
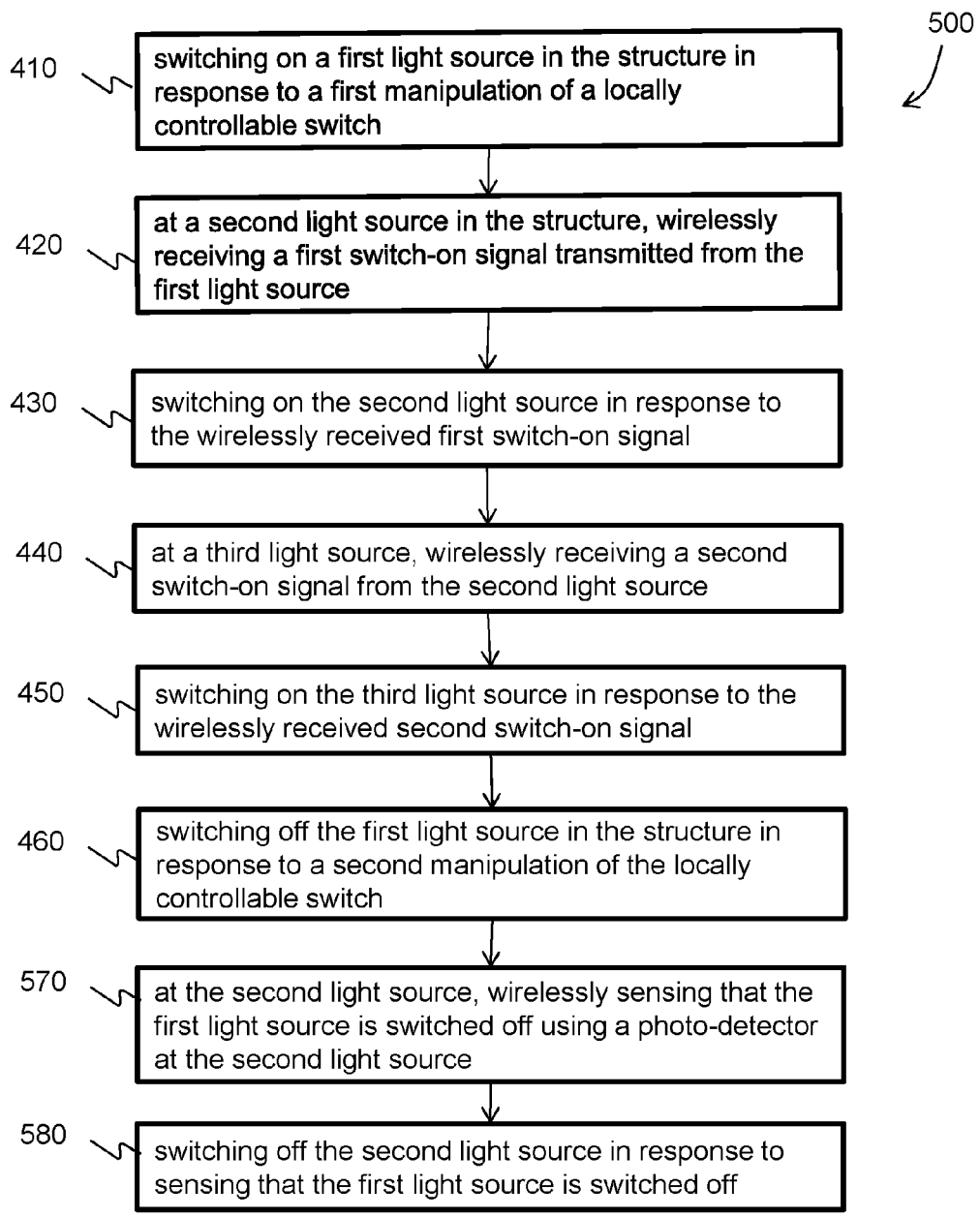
FIG. 5 shows another flow diagram representing an example method for controlling lighting in a structure, such as the wind turbine of FIG. 1.

FIG. 5 shows another example method 500 for switching on/off a plurality of light sources internal to a large structure, such as the wind turbine 100 in FIG. 1. The stages 410 through 460 are the same as in the method 400 of FIG. 4. However, in the method 500, switch-on signals are transmitted using visible light generated by the first and second lights sources. Therefore, instead of receiving a switch-off signal to trigger switching off, the second light source senses that the first light source is switched off using a photo-detector that can detect when ambient light falls below a predetermined threshold. Accordingly, in the method 500, the stages 470 and 480 which pertain to use of the switch-off signal, are omitted and replaced with corresponding stages 570 and 580.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A method for switching on/off a plurality of light sources internal to a wind turbine that includes a tower and a nacelle mounted on and supported by the tower, the method comprising:

manipulating one of: a first locally controllable switch located in a bottom portion of the tower and a second locally controllable switch located in the nacelle to switch on a first light source in the wind turbine;

at a second light source in the wind turbine, wirelessly receiving a first switch-on signal transmitted from the first light source; and switching on the second light source in response to the wirelessly received first switch-on signal.

2. The method according to claim 1, wherein the first switch-on signal is received as light from the first light source and a photo-detector at the second light source is used to wirelessly receive the light.

3. The method according to claim 1, wherein the first switch-on signal is one of a non-visible light signal, a radio frequency signal, and an acoustic signal emitted from a wireless transmitter located at the first light source.

4. The method according to claim 1, further comprising:
at a third light source, wirelessly receiving a second switch-on signal from the second light source; and
switching on the third light source in response to the wirelessly received second switch-on signal.

5. The method according to claim 1, further comprising:
switching off the first light source in the wind turbine in response to a second manipulation of the first locally controllable switch;
at the second light source, wirelessly receiving a switch-off signal transmitted from the first light source; and
switching off the second light source in response to the wirelessly received switch-off signal.

6. The method according to claim 1, further comprising:
switching off the first light source in the wind turbine in response to a second manipulation of the first locally controllable switch;
at the second light source, wirelessly sensing that the first light source is switched off using a photo-detector at the second light source; and
switching off the second light source in response to sensing that the first light source is switched off.

7. The method of claim 1, further comprising:
switching on a third light source in the wind turbine in response to a manipulation of a second locally controllable switch;
at a fourth light source in the wind turbine, wirelessly receiving a switch-on signal transmitted from the third light source; and
switching on the fourth light source in response to the switch-on signal wirelessly received from the third light source.

8. A wind turbine comprising:
a tower having a first access port for technicians;
a nacelle mounted on and supported by the tower and having a second access port for technicians;
a plurality of light sources mounted within the tower and the nacelle; and
a wireless lighting control system, the wireless lighting control system comprising:
a first locally controllable switch for controlling power to the plurality of light sources, the first locally controllable light switch being located proximate to the first access port;
a second locally controllable switch for controlling power to the plurality of light sources, the second locally controllable light switch being located proximate to the second access port; and
a remotely controllable light switch located at each of one or more of the light sources, the remotely controllable switch being configured to:
wirelessly receive a switch-on signal generated in response to manipulation of at least one of the first and second locally controllable switches; and
switch on power to the corresponding light source in response to receiving the switch-on signal.

9. The wind turbine according to claim 8, wherein at least one of the first and second locally controllable switches includes a wireless transmitter configured to generate and transmit the switch-on signal in response to manipulation of the at least one of the first and second locally controllable switches, and wherein the wireless transmitter is one of a visible light source, a non-visible light source, an acoustic transmitter, and a radio frequency transmitter.

10. The wind turbine according to claim 9, the wireless lighting control system further comprising a wireless transmitter located at each of one or more of the light sources,
wherein the switch-on signal is a first switch-on signal,
wherein the wireless transmitter is configured to generate a second switch-on signal as at least one of a non-visible light optical signal, a radio frequency signal, and an acoustic signal, and
wherein the remotely controllable switch located at each of one or more of the light sources is configured to wirelessly receive the first and/or second switch-on signals and switch on power to the corresponding light source in response to receiving the first and/or second switch-on signals.

11. The wind turbine according to claim 10, wherein the wireless transmitter of the at least one of the first and second locally controllable switches is further configured to generate and transmit a first switch-off signal,
wherein the wireless transmitter located at each of one or more of the light sources is further configured to generate a second switch-off signal as at least one of a non-visible light optical signal, a radio frequency signal, and an acoustic signal, and
wherein the remotely controllable switch located at each of one or more of the light sources is configured to wirelessly receive the first and/or second switch-off signals and switch off power to the corresponding light source in response to receiving the first and/or second switch-off signals.

12. The wind turbine according to claim 9,
wherein the switch-on signal is a first visible light switch-on signal,
wherein visible light generated by at least one of the plurality of light sources is a second visible light switch-on signal, and
wherein the remotely controllable switch located at each of the one or more light sources is configured to wirelessly receive the first and/or second visible light switch-on signals using a visible light photo-detector and switch on power to the corresponding light source in response to receiving the first and/or second switch-on signals.

13. The wind turbine according to claim 12, wherein the remotely controllable switch is further configured to wirelessly sense whether a neighboring light source is switched off using the visible light photo-detector and to switch off power to the corresponding light source in response to sensing that the neighboring light source is switched off.

* * * * *